United States Patent
Lonski

(10) Patent No.: US 8,807,306 B2
(45) Date of Patent: Aug. 19, 2014

(54) FRICTION DAMPER WITH A HOUSING FOR A DRUM-TYPE WASHING MACHINE WITH A SPINNING CYCLE

(75) Inventor: Rudolf Lonski, Golling (AT)

(73) Assignee: Suspa GmbH, Altdorf (DE)

( * ) Notice: Subject to any disclaimer, the term of this patent is extended or adjusted under 35 U.S.C. 154(b) by 0 days.

(21) Appl. No.: 12/662,293

(22) Filed: Apr. 9, 2010

(65) Prior Publication Data

US 2010/0258396 A1    Oct. 14, 2010

(30) Foreign Application Priority Data

Apr. 9, 2009  (DE) .......................... 10 2009 016 824

(51) Int. Cl.
*F16F 11/00* (2006.01)
*F16F 7/09* (2006.01)
*D06F 37/20* (2006.01)
*F16F 9/54* (2006.01)

(52) U.S. Cl.
CPC ............. *F16F 7/09* (2013.01); *F16F 2222/025* (2013.01); *D06F 37/20* (2013.01)
USPC .................. 188/381; 188/322.17; 188/322.18

(58) Field of Classification Search
USPC ................ 188/110, 381, 38, 151 R, 322.17, 188/322.18, 322.19; 267/134, 196
See application file for complete search history.

(56) References Cited

U.S. PATENT DOCUMENTS

| | | | | | |
|---|---|---|---|---|---|
| 1,171,722 | A | * | 2/1916 | Hough | 267/196 |
| 3,020,451 | A | * | 2/1962 | McAdam | 361/709 |
| 3,557,654 | A | * | 1/1971 | Weidner, Jr. | 411/396 |
| 3,910,164 | A | * | 10/1975 | Swadner et al. | 92/128 |
| 4,793,451 | A | * | 12/1988 | Taylor | 188/316 |
| 6,140,613 | A | * | 10/2000 | Tsuno | 219/432 |
| 6,390,253 | B1 | * | 5/2002 | Oliver | 188/267.2 |
| 6,454,251 | B1 | * | 9/2002 | Fish | 267/166 |
| 2001/0017964 | A1 | * | 8/2001 | Setoguchi | 385/88 |
| 2002/0050703 | A1 | * | 5/2002 | Whang et al. | 280/737 |
| 2004/0134731 | A1 | * | 7/2004 | Kos et al. | 188/322.16 |
| 2005/0211517 | A1 | * | 9/2005 | Carlson | 188/267 |
| 2006/0010935 | A1 | * | 1/2006 | Park et al. | 68/3 R |
| 2008/0287585 | A1 | * | 11/2008 | Brown | 524/424 |
| 2009/0205913 | A1 | * | 8/2009 | Hart | 188/267.2 |
| 2010/0171099 | A1 | * | 7/2010 | Tombler et al. | 257/40 |

FOREIGN PATENT DOCUMENTS

DE             38 74 677 T2      5/1988
DE    10 2008 013 220 A1       9/2008

* cited by examiner

*Primary Examiner* — Melody Burch

(74) *Attorney, Agent, or Firm* — Browdy and Neimark, PLLC

(57) ABSTRACT

A friction damper is proposed, in particular for drum-type washing machines with a spinning cycle, with a movable piston rod which is arranged in a housing (1) parallel to the longitudinal axis of the housing and is guided out of the housing (1), wherein the housing (1) comprises at least one plastic element (3) and at least one metal element (2) which is both producible cost-effectively and at the same time also withstands relatively high stresses. This is achieved according to the invention in that at least the metal element (2) has at least one metal with a heat conductivity of at least 150 watts per meter and Kelvin (150 W/(m*K))).

26 Claims, 5 Drawing Sheets

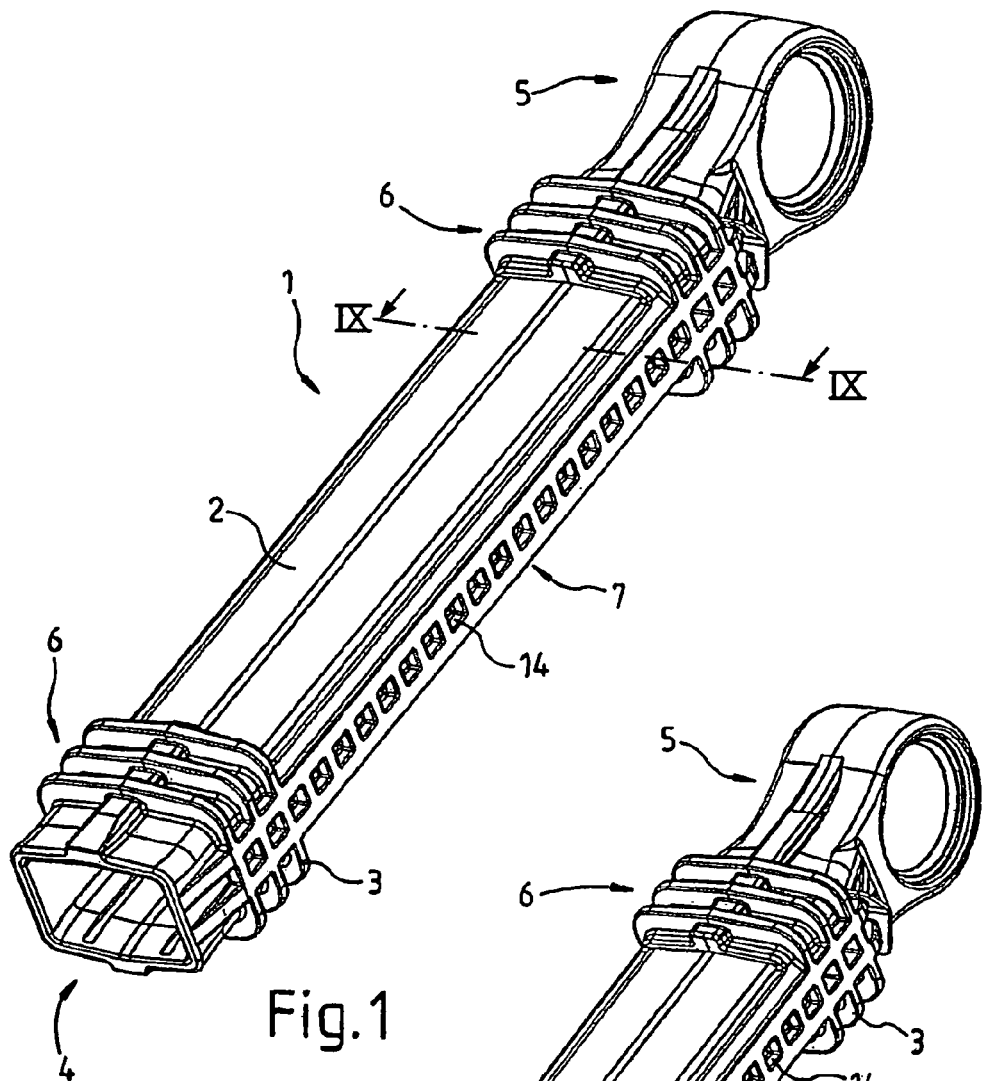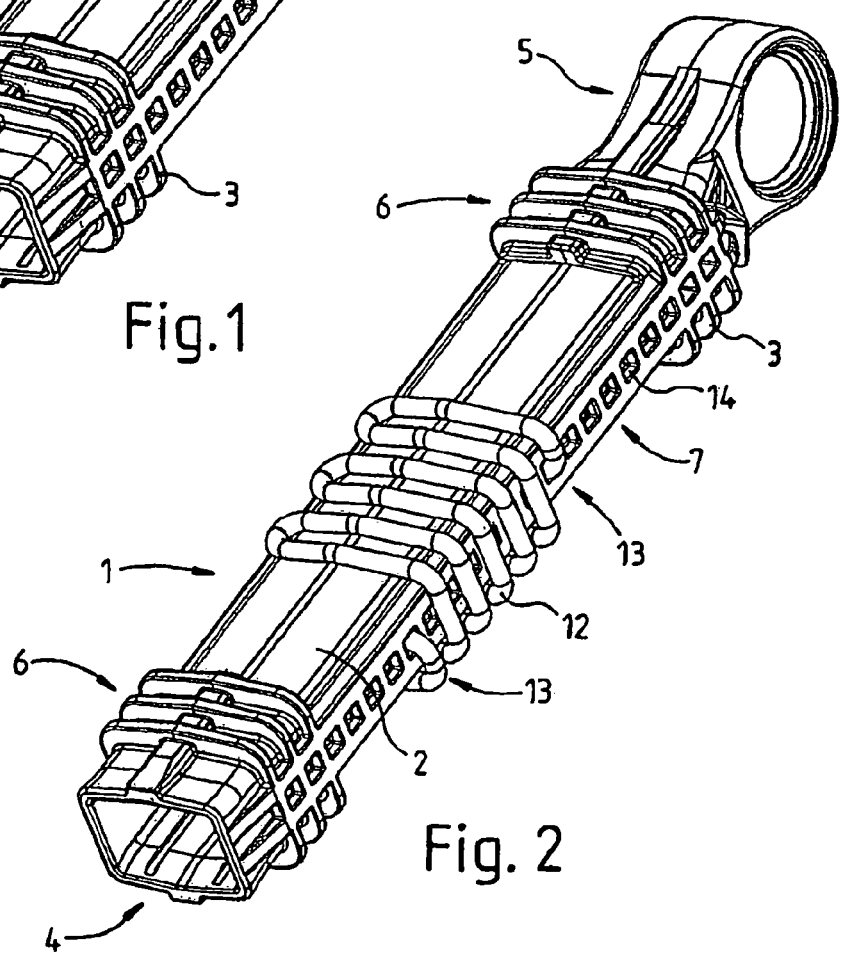

Figure 3:
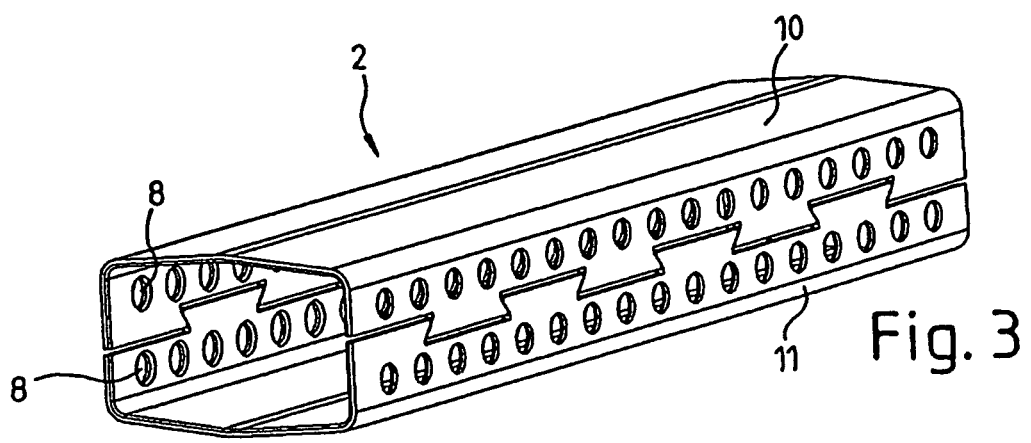

FRICTION DAMPER WITH A HOUSING FOR A DRUM-TYPE WASHING MACHINE WITH A SPINNING CYCLE

The invention relates to a friction damper with a housing, in particular for drum-type washing machines with a spinning cycle, in accordance with the precharacterizing clause of claim 1.

PRIOR ART

Friction dampers for washing machines are already employed in many cases to damp the drum, in particular to counteract the imbalances during the spinning cycle. For this purpose, the friction dampers essentially have two main components, firstly a housing fixed on the end side by means of a securing device or eye. Secondly, the friction dampers have a plunger or piston rod which is adjustable longitudinally with respect to the housing and is likewise fixable on the end side by means of a securing device or eye. The plunger or the piston rod has a contact surface with the housing, a special friction body generally being provided in order to damp the movement of the plunger relative to the housing.

DE 10 2008 013 220 A1, for example, discloses a friction damper with a plastic housing. DE 38 74 677 T2 discloses a friction damper for washing machines, wherein the housing comprises a metal tube on which injection-molded plastic components are provided for mechanical support.

In practice, however, it has been shown that, although plastic housings can be produced cost-effectively by injection molding, heat generated under severe stress may have an adverse effect on the housing. The use of a steel sleeve also results sometimes in the heat not being able to be removed to a sufficient extent.

OBJECT AND ADVANTAGES OF THE INVENTION

By contrast, it is the object of the invention to propose a friction damper with a housing which is both producible cost-effectively and at the same time also withstands relatively high stresses.

Starting from a friction damper of the type mentioned in the introduction, this object is achieved by the characterizing features of claim 1. Advantageous embodiments and developments of the invention are possible through the measures mentioned in the dependent claims.

Correspondingly, a friction damper according to the invention is distinguished in that at least the metal element has at least one metal having a heat conductivity of at least 150 watts per meter and Kelvin (150 W/(m*K)). The effect achieved with the aid of such an advantageous, high heat conductivity of the metal is that the heat is distributed rapidly and preferably over a large surface area or is removed to the surroundings. This very substantially avoids an adverse effect particularly on the plastic components of the housing. Consequently, a friction damper having high operational durability can be produced and is also producible cost-effectively.

The metal of the metal element preferably has a heat conductivity of between 200 and 500 W/(m*k). It has been shown in the first practice tests that such a heat conductivity of the metal is of great advantage. In this case, there are also a number of different metals to choose from, some which are extremely cost-effective and also have sufficient or advantageous mechanical stability.

The metal element advantageously at least comprises aluminum or is substantially composed of aluminum. Aluminum has a heat conductivity of approximately 221 W/(m*K) and therefore lies within a particularly advantageous heat-conductivity range for such applications.

In addition, aluminum is corrosion resistant, which is of particular importance especially for use in washing machines and enables surface finishing to be dispensed with. This results in an economically favorable friction damper according to the invention.

Furthermore, aluminum has sufficient stability even in the form of comparatively thin sheets, which in turn has additionally proven cost-effective.

In a preferred embodiment of the invention, the metal element is in the form of a single piece and/or in the form of a bent metal sheet or bent metal part and/or in the form of an extrusion-cast metal. With the aid of these measures, the metal element can be separated, in particular punched, out of a planar or plane metal sheet panel and cost-effectively adapted to the desired shape or cross section of the housing by means of one or more bending steps. It can likewise also be produced in an advantageous manner by means of an extrusion process and cut off to the desired length, in particular trimmed off or sawn off.

In principle, the metal element may have end sides which are connected to one another, in particular welded or adhesively bonded to one another, in the longitudinal direction of the housing. However, the connection or welding of such longitudinally oriented edges or end sides may advantageously be dispensed with. It is precisely with the aid of the last-mentioned or open variant that a particularly cost-effective production of a metal and plastic composite housing can be realized.

In the case of the metal element variant which is open on the end side, a (circumferentially) closed housing can be realized in an advantageous manner with the aid of the plastic component. For example, a metal sheet element which is open in the longitudinal direction is encapsulated with plastic by injection molding in such a manner that a closed friction damper housing is realized.

In a particular development of the invention, for example two metal elements are provided which are arranged on opposite sides of the housing and are connected to each other, for example on two in particular opposite longitudinal sides, i.e. along the longitudinal axis of the housing, by means of plastic or injection-molded plastic. This makes it also possible to produce a circumferentially closed housing which is producible both in a mechanically stable manner and also cost-effectively.

The metal element advantageously comprises at least one contact surface of a friction element of the piston rod. The effect achieved by this is that the heat generation produced in the region of the contact surface is conducted away or on further as rapidly as possible such that the housing is not adversely affected.

At least two separate contact surfaces are preferably provided. This enables a plunger or a piston rod to be used in an advantageous manner with an angular cross section, with it being possible for two separate, in particular comparatively large contact surfaces of the friction element to be realized.

In the case of an angular cross section of the friction element or of the housing, it is particularly advantageous that in particular flat or planar friction bodies can be used, such as, for example, friction bodies which are punched out, for example in the form of an individual piece of foam or the like.

In principle, however, the invention may also be used in an advantageous manner in the case of housings having a round or oval cross section. In this case, use may be made of friction bodies which, for example, have likewise been punched or cut out of a foam panel and installed in the appropriately bent state.

The metal element advantageously has at least one recess for receiving plastic or part of the plastic element. The connection of the metal element/elements to the plastic or the injection-molded plastic is improved with the aid of such a recess, in particular with the aid of numerous recesses. In this connection, the liquid plastic can penetrate the recess and fill the latter during the injection-molding operation. This enables a particularly advantageous connection to be realized between metal and plastic components. A particularly good connection between plastic and metal is realized by means of a plurality of or numerous recesses.

In a preferred variant of the invention, the housing comprises at least the contact surface or the contact surfaces and at least one preferably separate or adjacent connecting surface which comprises the recess and is intended for connecting the plastic element to the metal element. The effect achieved by this is that the housing is in contact with the friction element of the piston rod in the region of the contact surface and not in the region of the connecting surfaces, some of which have a plastic surface. The effect achieved by this is that the heat generated in the region of the contact surface is absorbed or conducted away by the metal and not by the plastic.

The abovementioned measure also has the effect that at least no significant mechanical stressing of the connecting surface takes place by adjustment of the piston rod with respect to the housing, which could otherwise lead to disadvantageous wear or abrasion of the connecting surface and therefore to a mechanical adverse effect on the housing.

In an advantageous manner, the housing and/or the metal element has surface-increasing structures and/or a heat-conducting element. The effect achieved with the aid of such surface-increasing structures, such as, for example, indentations or bulges, beads or the like, is that the frictional heat is advantageously removed even more efficiently to the surroundings. The same applies to the heat-conducting element. The latter also results in operation in an improved conducting away of the frictional heat.

The heat-conducting element is preferably arrangeable as a separate heat-conducting element in a releasably fixable manner on the housing and/or on the metal element. With the aid of such a separate heat-conducting element, use can be made, for example, of a metal element made of metal sheet, and, depending on the requirement or application, one or more heat-conducting elements can additionally or retrospectively be attached to the housing or directly to the metal element. This results in a significant increase in the surface in contact with the ambient air and also of the mass, which is expressed in a particularly advantageous conducting away of heat and heat absorption.

In a particularly advantageous variant of the invention, the heat-conducting element is in the form of a metal clip. Such a metal clip can be attached and fixed, for example in a self-clamping manner, to the housing or to the metal element of the housing. This enables a separate fixing, for example by means of welding or adhesive bonding processes, to be dispensed with.

The heat-conducting element is advantageously formed from bent (round or angular) metal wire. A corresponding metal wire is a particularly favorable starting material and results in economically favorable production of the heat-conducting element.

Furthermore, the heat conductivity of the friction damper housing can be improved by the plastic element having heat-conducting additives. In this case, very different materials are conceivable. For example, metallic and/or carbon-containing additives are of particular interest. In particular carbon fibers and carbon nanotubes having a heat conductivity of approx. 6000 W/(m*K) are of particular significance in this case for the future.

Furthermore, ventilation openings can advantageously also be provided on the housing, as a result of which, for example, the piston stroke is usable for cooling or ventilation. Conducting away of heat from the contact surfaces or from the housing is also improved as a result.

EXEMPLARY EMBODIMENT

An exemplary embodiment of the invention is illustrated in the drawing and is explained in more detail below with reference to the figures.

Figure 4:
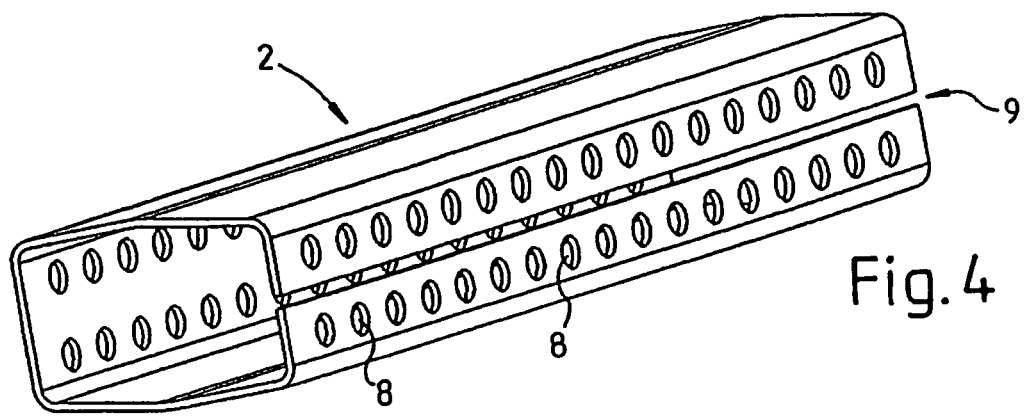
Figure 5:
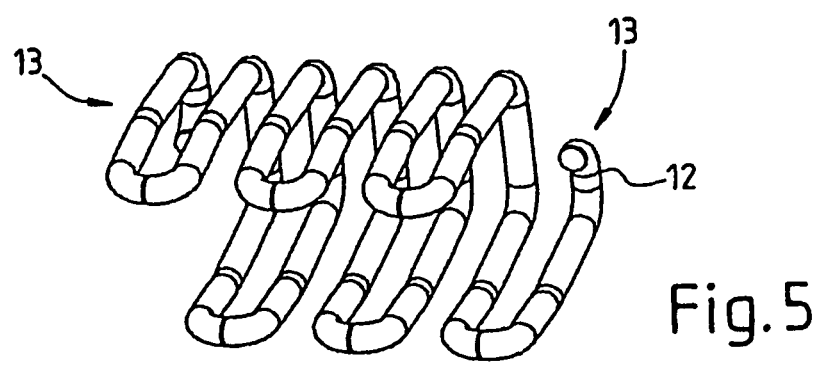
Figure 6:
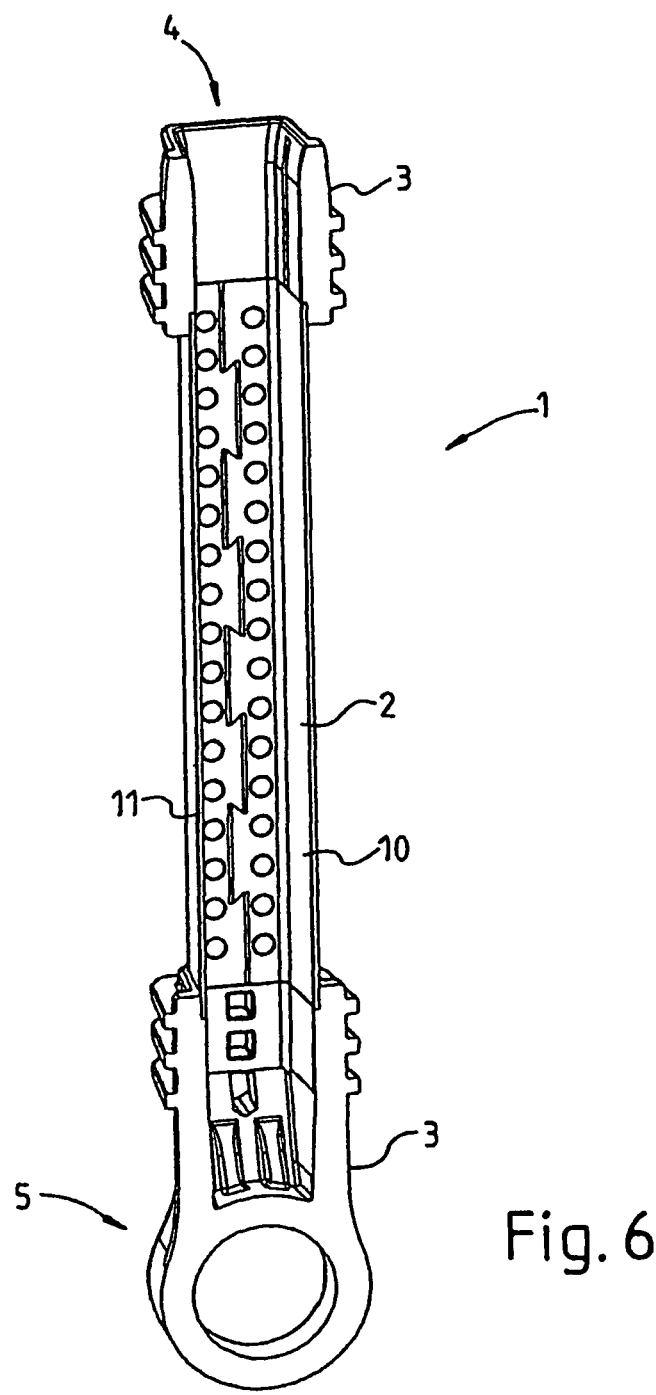
Figure 7:
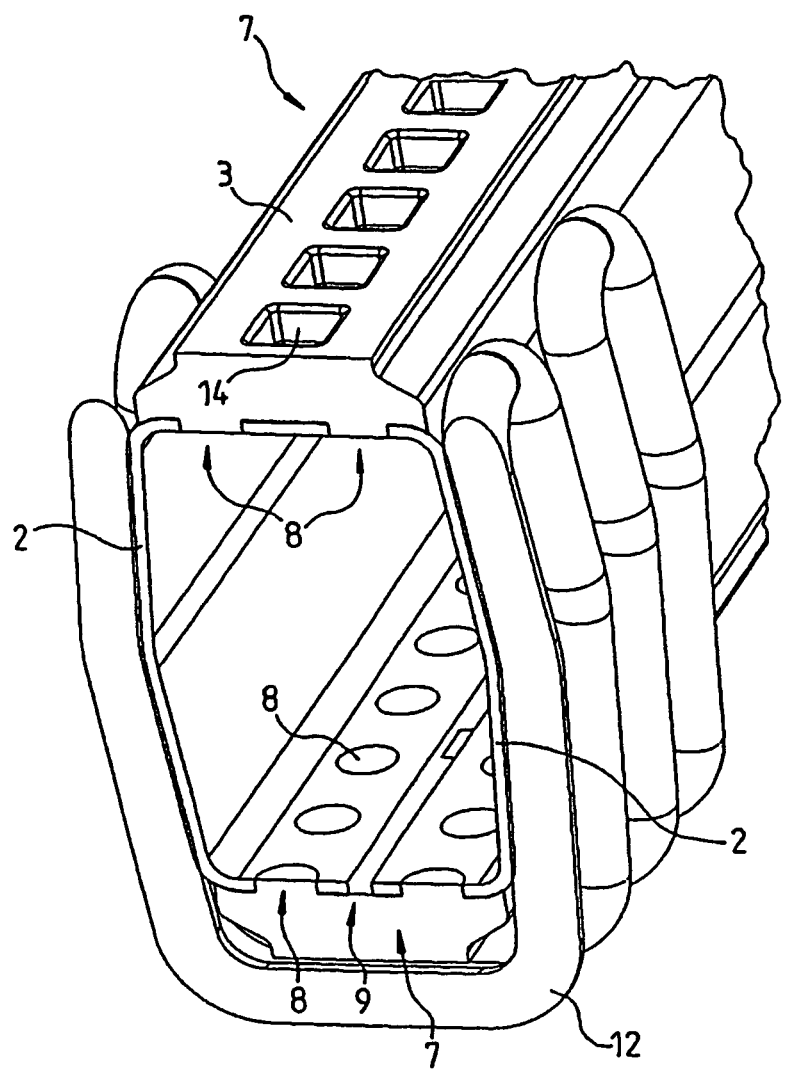
Figure 8:
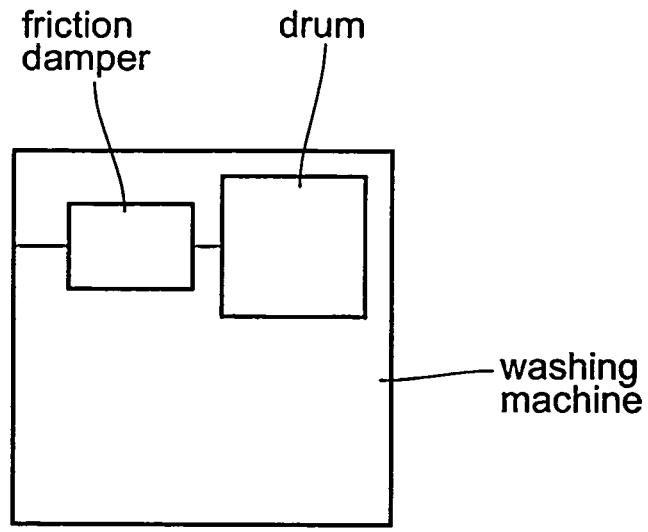
Figure 9:
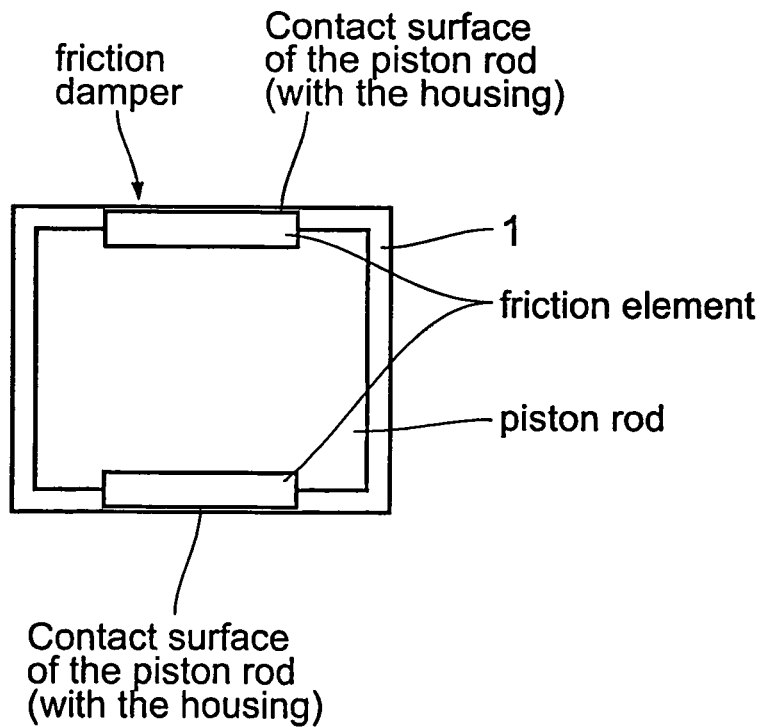

In detail:

FIG. 1 shows a schematic, perspective view of a friction damper housing according to the invention, FIG. 2 shows a schematic, perspective view of the housing according to FIG. 1 with a heat-conducting clip, FIG. 3 shows a schematic, perspective view of two metal sheet inserts for a friction damper according to the invention, FIG. 4 shows a schematic, perspective view of a single-piece metal insert for a friction damper according to the invention, FIG. 5 shows a schematic, perspective view of a heat-conducting clip for a friction damper according to the invention, FIG. 6 shows a schematic, perspective view of a friction damper housing according to the invention in longitudinal section, FIG. 7 shows a schematic, perspective illustration in cross section of a friction damper housing according to the invention with a heat-conducting clip, FIG. 8 is a schematic side view illustrating a washing machine and the friction damper housing in a washing machine; and FIG. 9 is a schematic view of the friction damper housing taken along the line IX-IX of FIG. 1 with a piston disposed in the friction damper housing.

FIG. 1 schematically illustrates a housing 1 of a friction damper according to the invention. Said housing 1 has a metal insert 2, preferably made of aluminum, and a plastic component 3. FIG. 8 schematically illustrates the arrangement of the friction damper housing 1 in a washing machine with a drum and a spinning cycle. FIG. 9 schematically illustrates along the line IX-IX of FIG. 1 a piston disposed in the friction damper and the contact surface as heretofore described.

The plastic component 3 is connected to the metal 2 by means of an advantageous injection-molding process. In this case, the plastic component 3 has supporting structures 6, particularly in the region of a housing opening 4 and a retaining eye 5, with which structures a particularly mechanically stable construction is realized.

Furthermore, the housing 1 additionally likewise has supporting structures 7 on the longitudinal sides, in particular on the narrow sides in the longitudinal direction, with which structures the housing is correspondingly reinforced or supported.

As becomes clear, for example, in the enlarged cutout cross-sectional illustration according to FIG. 7, the metal inserts 2 have recesses 8 which are filled by the plastic component 3. This applies in particular also to a longitudinal gap 9 which is produced by, in the case of the exemplary embodiment according to FIG. 7, a single-piece, bent metal sheet 2 having been used as the metal insert according to the invention. In this case, the metal sleeve 2 is not connected in the longitudinal direction at the location of the joint or at the adjacent end sides by means of a metallic connection, such as, for example, welding or the like. On the contrary, the gap 9 is consciously realized here, thus enabling plastic from the plastic component 3 to penetrate the gap 9 and fill the latter during the injection molding or encapsulation of the metal insert 2. This results in a particularly simple and also effective connection between metal component 2 and plastic component 3.

The numerous recesses 8 in the metal insert 2 result in particular in a particularly stable, unseparable connection between plastic 3 and metal 2.

The metal insert 2 according to the exemplary embodiment in FIG. 7 is illustrated schematically in FIG. 4 without plastic component 3. The numerous recesses 8 which preferably extend in a number of rows along the longitudinal axis of the housing become very particularly clear in this case.

By contrast, FIG. 3 illustrates a variant of the metal insert 2, the latter being composed of two separate housing parts 10, 11. On their narrow sides in the longitudinal direction, the two housing parts 10, 11 have a dovetail toothing or an advantageous toothing, and therefore the two separate parts 10, 11, even in the preassembled state, i.e. without plastic component 3, form a substantially closed housing. Furthermore, it can be gathered from FIG. 3 that parts 10, 11 also have numerous recesses 8 in the longitudinal direction of the housing.

FIG. 2 illustrates a second variant of the invention in which the friction damper housing 1 additionally has a clip 12. Said clip 12 is a metallic heat-conducting element which is provided to enlarge the surface of the housing 1. The conducting away of heat can thereby be additionally improved in a particularly simple manner, i.e. without changing the metal insert 2. Furthermore, the metal clip 12 also results in the housing being mechanically supported.

As is clear in FIG. 2, the clip 12 is designed in such a manner that the ends 13 engage in cutouts 14 in the supporting structure 7, and therefore said clip is fixed to the housing 1 in an advantageous manner.

FIG. 5 depicts the clip 12 schematically as a separate component. It is clear here that said component involves a metallic wire which is bent in a corresponding manner. The clip 12 is producible in a correspondingly cost-effective and simple manner.

An advantage of a separate clip 12 of this type is in particular that, for example, said clip is attached/retrofitted or not attached to the housing 1 depending on requirements. Furthermore, one or more clips 12 can also be arranged on the housing 1 in an advantageous manner should particularly high stresses be anticipated on the friction damper according to the invention. Accordingly, there can be modular adaptation to a very wide variety of stresses which can be anticipated.

The metal inserts 2 and the metal components 10, 11 are produced in an advantageous manner from aluminum or aluminum sheet. Aluminum has a particularly advantageous heat conductivity of approximately 220 W/(m*K) which has proven particularly advantageous in a preliminary investigation. Furthermore, corrosion-protecting surface coverings can be omitted when aluminum is used, which is cost-effective in comparison to conventional steel.

Furthermore, use can be made of a comparatively thin metal sheet or aluminum sheet, in particular of less than 1 mm, which is likewise cost-effective.

In comparison to a plastic housing, a housing 1 according to the invention furthermore has the advantage that the "stick/slip effect" of a friction element or friction covering along the metal insert 2 is significantly reduced or completely avoided.

Furthermore, the clip 12 has the advantage of increasing the removal of heat and also significantly increasing the mass for absorbing the heat and in addition contributes to the wall thickness of the metal insert 2 and of the metal parts 10, 11 being able to be further reduced. This also results in improved economic efficiency of a friction damper according to the invention. For example, the clip 12 has diameter of approx. 1 to 7 mm, preferably approximately 2.5 mm.

In general, it is advantageous to bring the clip 12 into contact preferably with the metal inserts 2 on the wide sides of the housing or over as large a surface area as possible on the housing 1.

In the case of an angular cross section of the housing 1 according to the exemplary embodiments depicted in the figures, it is furthermore advantageous if the clip 12 is free on the narrow sides or is spaced apart therefrom such that the housing 1 is not disadvantageously distorted.

LIST OF REFERENCE NUMBERS

1 Housing
2 Metal insert
3 Plastic component
4 Opening
5 Eye
6 Structure
7 Structure
8 Recess
9 Gap
10 Part
11 Part
12 Clip
13 End
14 Cutout

What is claimed is:

1. A friction damper for a washing machine with a drum and a spinning cycle, said friction damper comprising a movable piston rod which is arranged in a housing (1) parallel to the longitudinal axis of the housing and is guided out of the housing (1), the movable piston rod comprising a friction element, wherein the housing (1) comprises at least one plastic element (3) and at least one heat conducting metal element (2), with the at least one heat conducting metal element having at least one metal having a heat conductivity of at least 150 watts per meter and Kelvin (150 W/(m*K)) and at least one contact surface in direct contact with the at least one plastic element, and
 wherein the at least one contact surface is adjacent to and directly abutting against the friction element of the movable piston rod,
 wherein frictional damping is provided by relative motion between the friction element of the movable piston rod and the at least one contact surface, and
 wherein heat generated in the contact surface is absorbed or conducted away by the heat conducting metal and not substantially absorbed by the at least one plastic element.

2. The friction damper according to claim 1, wherein the at least one metal of the at least one heat conducting metal element (2) has a heat conductivity of between 200 and 500 watts per meter and Kelvin (200-500 W/(m*K)).

3. The friction damper according to claim 1 or 2 wherein the at least one heat conducting metal element (2) is aluminum.

4. The friction damper according to claim 1, wherein the at least one heat conducting metal element (2) is substantially composed of aluminum.

5. The friction damper according to claim 1, wherein the at least one heat conducting metal element (2) is a bent metal part.

6. The friction damper according to claim 1, wherein the at least one heat conducting metal element (2) is an extrusion-cast metal part.

7. The friction damper according to claim 1, wherein the at least one metal element is a single-piece heat conducting metal element (2).

8. The friction damper according to claim 1, wherein the at least one contact surface comprises at least two separate contact surfaces.

9. The friction damper according to claim 8, wherein the at least two separate contact surfaces are arranged on opposite sides of the housing (1).

10. The friction damper according to claim 1, wherein the at least one plastic element (3) has heat-conducting additives.

11. The friction damper according to claim 10, wherein the heat-conducting additives are at least one member selected from a group consisting of metallic-containing and carbon-containing additives.

12. The friction damper according to claim 11, wherein the heat-conducting additives comprise at least one member selected from a group consisting of carbon fibers and carbon nanotubes.

13. The friction damper according to claim 10, wherein the heat-conducting additives have a heat conductivity of approximately 6,000 watts per meter and Kelvin (6,000 W/(m*K)).

14. A friction damper for a washing machine with a spinning cycle, said washing machine having a drum, said friction damper comprising a movable piston rod which is arranged in a housing (1) parallel to the longitudinal axis of the housing and is guided out of the housing (1), the movable piston rod comprising a friction element, wherein the housing (1) comprises at least one plastic element (3) and at least one first heat conducting metal element (2), wherein the at least one first heat conducting metal element (2) has at least one metal having a heat conductivity of at least 150 watts per meter and Kelvin (150 W/(m*K)) and at least one contact surface in direct contact with the at least one plastic element, wherein at least one of the housing (1) and the at least one first heat conducting metal element (2) has surface-increasing structures,
wherein the at least one contact surface is adjacent to and directly abutting against the friction element of the movable piston rod,
wherein frictional damping is provided by relative motion between the friction element of the movable piston rod and the at least one contact surface, and
wherein heat generated by the friction element is absorbed or conducted away by the heat conducting metal element and not substantially absorbed by the at least plastic element.

15. The friction damper according to claim 14, further comprising a second heat-conducting metal element (12) separate from the at least one first heat-conducting metal element, and releasably fixed on at least one of the housing (1) and the first heat conducting metal element (2).

16. The friction damper according to claim 15, wherein the second heat-conducting metal element (12) is a metal clip.

17. The friction damper according to claim 15, wherein the second heat-conducting metal element (12) is a bent metal wire.

18. The friction damper according to claim 16, wherein the metal clip is fixed to the at least one of the housing (1) and the first heat conducting metal element (2) in a self-clamping manner.

19. The friction damper according to claim 18, wherein the metal clip is separately fixed by means of a welding or an adhesive bonding process.

20. The friction damper according to claim 14, wherein the surface-increasing structures are at least one member selected from a group consisting of indentations, bulges and beads.

21. A friction damper for a washing machine with a spinning cycle, said washing machine having a drum with a piston rod which is arranged in a plastic cylinder housing (1) movable in parallel to the longitudinal axis of the housing and is guided out of the housing (1), the piston rod comprising a friction element, wherein the plastic cylinder housing (1) comprises at least one plastic element (3) and at least one metal element (2), wherein the at least one metal element (2) is disposed along the length of the plastic cylinder housing and is a heat conducting metal element having at least one contact surface in direct contact with the friction element of the movable piston rod and at least one metal having a heat conductivity of at least 150 watts per meter and Kelvin (150 W/m*K)) disposed adjacent to said friction element and said piston rod, wherein the at least one metal element (2) is connected to the at least one plastic element (3) by means of at least one recess (8, 9) built within the at least one metal element (2), whereby heat generated by the friction element is absorbed or conducted away by the heat conducting metal element and not substantially absorbed by the at least one plastic element,
wherein the at least one contact surface is adjacent to and directly abutting against the friction element of the movable piston rod, and
wherein frictional damping is provided by relative motion between the friction element of the movable piston rod and the at least one contact surface.

22. The friction damper according to claim 21, wherein the at least one plastic element (3) is injection-molded, and wherein the liquid plastic penetrates the at least one recess (8, 9) and fills the at least one recess (8, 9) during the injection-molding operation.

23. The friction damper according to claim 21, wherein the housing (1) has the at least one contact surface and at least one connecting surface which has the at least one recess (8, 9) for connecting the at least one plastic element (3) to the at least one heat conducting metal element (2).

24. The friction damper according to claim 21, wherein the at least one recess comprises numerous recesses (8).

25. The friction damper according to claim 24, wherein the numerous recesses (8) extend in a number of rows along the longitudinal axis of the housing (1).

26. The friction damper according to claim 1, wherein a cross section of the housing (1) is substantially of a polygon shape.

* * * * *